(12) United States Patent
Wang et al.

(10) Patent No.: US 11,227,261 B2
(45) Date of Patent: Jan. 18, 2022

(54) TRANSACTIONAL ELECTRONIC MEETING SCHEDULING UTILIZING DYNAMIC AVAILABILITY RENDERING

(71) Applicant: salesforce.com, inc., San Francisco, CA (US)

(72) Inventors: Kedao Wang, Palo Alto, CA (US); Megan Schoendorf, Palo Alto, CA (US); Adam Evans, Redwood City, CA (US)

(73) Assignee: salesforce.com, Inc., San Francisco, CA (US)

( * ) Notice: Subject to any disclaimer, the term of this patent is extended or adjusted under 35 U.S.C. 154(b) by 318 days.

(21) Appl. No.: 14/723,254

(22) Filed: May 27, 2015

(65) Prior Publication Data
US 2016/0350719 A1    Dec. 1, 2016

(51) Int. Cl.
*G06Q 10/10* (2012.01)
*H04L 12/58* (2006.01)

(52) U.S. Cl.
CPC ....... *G06Q 10/1095* (2013.01); *G06Q 10/107* (2013.01); *G06Q 10/1093* (2013.01); *H04L 51/10* (2013.01)

(58) Field of Classification Search
CPC .................................................. G06Q 10/1095
See application file for complete search history.

(56) References Cited

U.S. PATENT DOCUMENTS

| | | |
|---|---|---|
| 5,438,660 A | 8/1995 | Lee et al. |
| 5,577,188 A | 11/1996 | Zhu |

(Continued)

FOREIGN PATENT DOCUMENTS

| | | |
|---|---|---|
| EP | 2424181 | 2/2012 |
| EP | 2424181 A1 | 2/2012 |

OTHER PUBLICATIONS

Maygol Kananizadeh, A Web-Based Scheduling System for Enterprise Social Networking Summit, Presented to the faculty of the Department of Computer Science California State University, Sacramento, Submitted in partial satisfaction of the requirements for the degree of Master of Science, Fall 2012 (Year: 2012).*

(Continued)

*Primary Examiner* — Andre D Boyce
(74) *Attorney, Agent, or Firm* — Kwan & Olynick LLP

(57) ABSTRACT

Techniques for electronic calendar management. Electronic computing device(s) is/are used to generate an electronic message comprising at least one indication of a proposed electronic calendar entry. The electronic computing device(s) transmit the electronic message to a recipient. The electronic computing device(s) receive, after the electronic message has been received by the recipient, a request for one or more images corresponding to the at least on indication of a proposed electronic calendar entry. The electronic computing device(s) check in response to receiving the request, at least one electronic calendar to determine a status of the calendar at a time corresponding to each of the at least one proposed electronic calendar entry. The electronic computing device(s) generate, for each proposed electronic calendar entry for which corresponding time is available, a graphical representation of each available proposed electronic calendar entry. The electronic computing device(s) transmit, in response to the request, the graphical representation to the recipient.

18 Claims, 12 Drawing Sheets

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,664,109 A | 9/1997 | Johnson et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,887,120 A | 3/1999 | Wical |
| 5,905,866 A | 5/1999 | Nakabayashi et al. |
| 5,918,159 A | 6/1999 | Fomukong et al. |
| 5,963,953 A | 10/1999 | Cram et al. |
| 6,016,478 A * | 1/2000 | Zhang ............ G06Q 10/06314 705/7.19 |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,480,830 B1 | 11/2002 | Ford et al. |
| 6,513,063 B1 | 1/2003 | Julia et al. |
| 6,523,061 B1 | 2/2003 | Halversen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,738,767 B1 | 5/2004 | Chung et al. |
| 6,742,021 B1 | 5/2004 | Halverson et al. |
| 6,754,681 B2 | 6/2004 | Brodersen et al. |
| 6,757,718 B1 | 6/2004 | Halverson et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,036,128 B1 | 4/2006 | Julia et al. |
| 7,289,976 B2 | 10/2007 | Kihneman et al. |
| 7,340,411 B2 | 3/2008 | Cook |
| 7,340,484 B2 | 3/2008 | S et al. |
| 7,343,365 B2 | 3/2008 | Farnham et al. |
| 7,370,282 B2 | 5/2008 | Cary |
| 7,509,388 B2 | 3/2009 | Allen et al. |
| 7,620,655 B2 | 11/2009 | Larsson et al. |
| 7,720,674 B2 | 5/2010 | Kaiser et al. |
| 7,809,599 B2 | 10/2010 | Andrew et al. |
| 7,840,543 B2 | 11/2010 | Guiheneuf et al. |
| 7,904,321 B2 | 3/2011 | Moore et al. |
| 7,958,003 B2 | 6/2011 | De Vries et al. |
| 7,979,319 B2 | 7/2011 | Toulotte |
| 8,032,508 B2 | 10/2011 | Martinez et al. |
| 8,060,567 B2 | 11/2011 | Carroll et al. |
| 8,121,953 B1 * | 2/2012 | Orttung ............ G06Q 10/1095 705/35 |
| 8,244,566 B1 * | 8/2012 | Coley ............... G06Q 10/109 705/7.11 |
| 8,244,821 B2 | 8/2012 | Carroll et al. |
| 8,280,984 B2 | 10/2012 | Lance et al. |
| 8,682,736 B2 | 3/2014 | Flake et al. |
| 8,694,355 B2 | 4/2014 | Bui et al. |
| 8,799,826 B2 | 8/2014 | Missig et al. |
| 8,805,833 B2 | 8/2014 | Nath et al. |
| 8,849,806 B2 | 9/2014 | Walker et al. |
| 8,868,590 B1 | 10/2014 | Donneau-Golencer |
| 8,918,431 B2 | 12/2014 | Mark et al. |
| 9,330,381 B2 * | 5/2016 | Anzures ............ G06F 3/04842 |
| 9,762,520 B2 | 9/2017 | Wang et al. |
| 10,164,928 B2 | 12/2018 | Wang et al. |
| 2001/0044791 A1 | 11/2001 | Richter et al. |
| 2002/0007401 A1 | 1/2002 | Suzuki |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035487 A1 | 3/2002 | Brummel et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0099777 A1 * | 7/2002 | Gupta ............... G06F 17/241 709/206 |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0101169 A1 | 5/2003 | Bhatt et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0024739 A1 | 2/2004 | Copperman et al. |
| 2004/0027388 A1 | 2/2004 | Berg et al. |
| 2004/0117443 A1 * | 6/2004 | Barsness ............ G06Q 10/10 709/204 |
| 2004/0128001 A1 | 7/2004 | Levin et al. |

(56) References Cited

U.S. PATENT DOCUMENTS

| | | |
|---|---|---|
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0038680 A1 | 2/2005 | McMahon |
| 2005/0050555 A1 | 3/2005 | Exley et al. |
| 2005/0075748 A1 | 4/2005 | Gartland et al. |
| 2005/0091098 A1 | 4/2005 | Brodersen et al. |
| 2005/0102245 A1* | 5/2005 | Edlund ............... G06Q 10/109 705/80 |
| 2005/0114777 A1 | 5/2005 | Szeto |
| 2005/0197954 A1 | 9/2005 | Maitland et al. |
| 2005/0234738 A1 | 10/2005 | Hodes |
| 2006/0041460 A1* | 2/2006 | Aaron ............... G06Q 10/1093 705/7.18 |
| 2006/0075031 A1 | 4/2006 | Wagner et al. |
| 2006/0085436 A1 | 4/2006 | Dettinger et al. |
| 2006/0089945 A1 | 4/2006 | Paval |
| 2006/0136832 A1 | 6/2006 | Keller et al. |
| 2006/0190546 A1 | 8/2006 | Daniell |
| 2006/0190833 A1 | 8/2006 | SanGiovanni et al. |
| 2006/0245641 A1 | 11/2006 | Viola et al. |
| 2007/0038500 A1 | 2/2007 | Hammitt et al. |
| 2007/0112916 A1 | 5/2007 | Singh |
| 2007/0113191 A1 | 5/2007 | Keller et al. |
| 2007/0130111 A1 | 6/2007 | Stoudt et al. |
| 2007/0198648 A1 | 8/2007 | Allen et al. |
| 2007/0219875 A1 | 9/2007 | Toulotte |
| 2007/0244976 A1 | 10/2007 | Carroll et al. |
| 2008/0094205 A1 | 4/2008 | Thorn |
| 2008/0126244 A1 | 5/2008 | Loving et al. |
| 2008/0148181 A1 | 6/2008 | Reyes et al. |
| 2008/0228774 A1* | 9/2008 | Hamilton ............... H04L 51/04 |
| 2008/0243564 A1 | 10/2008 | Busch et al. |
| 2008/0262572 A1 | 10/2008 | Reinke et al. |
| 2008/0294482 A1* | 11/2008 | Bank ............... G06Q 10/06311 705/7.13 |
| 2009/0070322 A1 | 3/2009 | Salvetti et al. |
| 2009/0106224 A1 | 4/2009 | Roulland et al. |
| 2009/0171988 A1* | 7/2009 | Kikin-Gil ......... G06F 17/30899 |
| 2009/0177744 A1 | 7/2009 | Marlow et al. |
| 2009/0177754 A1 | 7/2009 | Brezina et al. |
| 2009/0259670 A1 | 10/2009 | Inmon |
| 2009/0307162 A1 | 12/2009 | Bui et al. |
| 2010/0004971 A1 | 1/2010 | Lee et al. |
| 2010/0017484 A1 | 1/2010 | Accapadi et al. |
| 2010/0030715 A1 | 2/2010 | Eustice et al. |
| 2010/0069035 A1 | 3/2010 | Johnson |
| 2010/0115423 A1 | 5/2010 | Miyashita |
| 2010/0122190 A1 | 5/2010 | Lu |
| 2010/0159978 A1 | 6/2010 | Sierawski |
| 2010/0162105 A1 | 6/2010 | Beebe et al. |
| 2010/0179961 A1 | 7/2010 | Berry et al. |
| 2010/0180200 A1 | 7/2010 | Donneau-Golencer et al. |
| 2010/0191566 A1* | 7/2010 | Loring ............... G06Q 10/109 705/7.19 |
| 2010/0191568 A1 | 7/2010 | Kashyap et al. |
| 2010/0293029 A1* | 11/2010 | Olliphant ............ G06Q 10/109 705/7.19 |
| 2010/0306185 A1 | 12/2010 | Smith et al. |
| 2011/0099189 A1 | 4/2011 | Barraclough et al. |
| 2011/0209068 A1 | 8/2011 | Vemuri |
| 2011/0239158 A1 | 9/2011 | Barraclough et al. |
| 2011/0271206 A1* | 11/2011 | Jones ............... G06F 3/0486 715/753 |
| 2011/0295612 A1 | 12/2011 | Donneau-Golencer et al. |
| 2011/0314115 A1* | 12/2011 | Nagaraj ............ G06Q 10/1095 709/206 |
| 2012/0011511 A1 | 1/2012 | Horvitz et al. |
| 2012/0059662 A1 | 3/2012 | Huisman, Jr. |
| 2012/0124153 A1 | 5/2012 | Carroll et al. |
| 2012/0131020 A1 | 5/2012 | Nitz et al. |
| 2012/0158472 A1 | 6/2012 | Singh et al. |
| 2012/0173464 A1 | 7/2012 | Tur et al. |
| 2012/0231770 A1* | 9/2012 | Clarke ............... H04L 51/34 455/414.1 |
| 2012/0297312 A1 | 11/2012 | Lance et al. |
| 2012/0297321 A1 | 11/2012 | Douglas et al. |
| 2013/0024924 A1 | 1/2013 | Brady et al. |
| 2013/0030872 A1 | 1/2013 | Oksman |
| 2013/0036369 A1 | 2/2013 | Mitchell et al. |
| 2013/0110842 A1 | 5/2013 | Donneau-Golencer et al. |
| 2013/0204673 A1 | 8/2013 | Gordon et al. |
| 2013/0254305 A1 | 9/2013 | Cheng et al. |
| 2014/0006079 A1* | 1/2014 | Keohane ............ G06Q 10/1093 705/7.19 |
| 2014/0019157 A1 | 1/2014 | Nudd et al. |
| 2014/0046876 A1 | 2/2014 | Zhang et al. |
| 2014/0282135 A1 | 9/2014 | Segre |
| 2014/0288990 A1 | 9/2014 | Moore et al. |
| 2014/0310044 A1* | 10/2014 | Meltzer ............. G06Q 10/1095 705/7.19 |
| 2015/0006218 A1* | 1/2015 | Klemm ............. G06Q 10/1095 705/7.19 |
| 2015/0081629 A1 | 3/2015 | Newman et al. |
| 2015/0142489 A1 | 5/2015 | Block et al. |
| 2015/0359000 A1 | 12/2015 | Li et al. |
| 2016/0078455 A1 | 3/2016 | O'Donnell et al. |
| 2016/0104159 A1 | 4/2016 | Butterfield et al. |
| 2016/0259761 A1* | 9/2016 | Laborczfalvi ....... G06F 17/2235 |

OTHER PUBLICATIONS

Non-Final Office Action from U.S. Appl. No. 14/810,230 dated Nov. 10, 2016, 16 pgs.

U.S. Appl. No. 13/229,591 entitled "Adaptive Ontology", 30 pages.

U.S. Appl. No. 13/287,983 entitled "Tools and Techniques for Extracting Knowledge from Unstructured Data Retrieved from Personal Data Sources", 28 pages.

U.S. Appl. No. 13/353,237 entitled "System and Method for Supporting Natural Language Queries and Requests Against a User's Personal Data Cloud", 52 pages.

International Search Report and Written Opinion for PCT/US2016/022217 dated May 23, 2016, 68 pages.

Final Office Action for U.S. Appl. No. 13/229,591, dated Jul. 18, 2014, 10 pages.

Final Office Action for U.S. Appl. No. 13/287,983, dated Jun. 9, 2014, 14 pages.

Final Office Action for U.S. Appl. No. 13/287,983, dated Nov. 30, 2015, 17 pages.

Final Office Action for U.S. Appl. No. 13/353,237, dated Aug. 13, 2015, 17 pages.

Non-Final Office Action for U.S. Appl. No. 13/229,591, dated Dec. 20, 2013, 11 pages.

Non-Final Office Action for U.S. Appl. No. 13/287,983, dated Dec. 20, 2013, 13 pages.

Non-Final Office Action for U.S. Appl. No. 13/287,983, dated Jul. 2, 2015, 15 pages.

Non-Final Office Action for U.S. Appl. No. 13/353,237, dated Feb. 11, 2016, 14 pages.

Non-Final Office Action for U.S. Appl. No. 13/353,237, dated Jan. 16, 2014, 12 pages.

Non-Final Office Action for U.S. Appl. No. 13/353,237, dated Oct. 29, 2014, 17 pages.

Notice of Allowance for U.S. Appl. No. 13/229,591, dated Nov. 7, 2014, 8 pages.

Notice of Allowance for U.S. Appl. No. 13/287,983, dated May 20, 2016, 8 pages.

Notice of Allowance for U.S. Appl. No. 13/353,237, dated Jun. 8, 2016, 19 pages.

Final Office Action for U.S. Appl. No. 14/789,728, dated Dec. 15, 2017, 26 pages.

(56) References Cited

OTHER PUBLICATIONS

International Preliminary Report on Patentability for International Application No. PCT/US2016/022217 dated Nov. 28, 2017, 6 pages.
International Preliminary Report on Patentability for International Application No. PCT/US2016/022217 dated May 23, 2016, 8 pages.
Non-Final Office Action for U.S. Appl. No. 14/789,728, dated May 4, 2017, 21 pages.
Non-Final Office Action for U.S. Appl. No. 14/810,230, dated Nov. 10, 2016, 8 pages.
Notice of Allowance for U.S. Appl. No. 14/810,230, dated May 10, 2017, 8 pages.
Non-Final Office Action for U.S. Appl. No. 15/701,236, dated Mar. 1, 2018, 5 pages.
Non-Final Office Action for U.S. Appl. No. 14/789,728, dated Jul. 26, 2018, 22 pages.
Notice of Allowance for U.S. Appl. No. 15/701,236, dated Aug. 29, 2018, 7 pages.
Final Office Action for U.S. Appl. No. 14/789,728 dated Feb. 6, 2019, 22 pages.
Non-Final Office Action for U.S. Appl. No. 16/226,451 dated Apr. 16, 2020, 7 pages.
Non-Final Office Action for U.S. Appl. No. 14/789,728 dated Dec. 27, 2019, 22 pages.
Notice of Allowance for U.S. Appl. No. 16/226,451 dated Sep. 2, 2020, 7 pages.

* cited by examiner

1200

Invitation Sent!

Please check your inbox to accept the invitation.

Other Keven : Keven Wang
Mon 5/25, 2:30 PM - 3:00 PM
Cancel meeting

Go back

This time has recently been booked.

Please select another available time:

Mon 5/25, 2:30 PM - 3:00 PM >

FIG. 13

TRANSACTIONAL ELECTRONIC MEETING SCHEDULING UTILIZING DYNAMIC AVAILABILITY RENDERING

TECHNICAL FIELD

Embodiments relate to electronic calendaring. More particularly, embodiments relate to techniques efficient management and coordination using electronic calendars.

BACKGROUND

Electronic calendars are a convenient way for people to manage and organize their time. For a user to manage their own time is fairly straight forward. However as groups of people try to manage group activities using electronic calendars, the coordination efforts can become complex. Multiple iterations of requests and responses are often required when scheduling with a multiple people for multiple times. Some electronic calendars provide some visibility into available time, but this does not race-type conflicts.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 12 is an example of a confirmation interface.

FIG. 13 is an example notification interface.

DETAILED DESCRIPTION

In the following description, numerous specific details are set forth. However, embodiments of the invention may be practiced without these specific details. In other instances, well-known circuits, structures and techniques have not been shown in detail in order not to obscure the understanding of this description.

Using the techniques described herein dynamic calendaring can streamline meeting scheduling to a single email and a single click. In various embodiments, a use can embed his/her availability via images (one per time slot) into an email. When the recipient opens the email, the email reflects the current availability as of the time the email is opened. For timeslots that are no longer available (e.g., have been taken between generation of the email and opening of the email) an empty image is returned, which effectively hides the timeslot from the recipient of the email.

The techniques described herein are particularly useful for a user who wishes to schedule meetings with multiple parties. For example, a supervisor may wish to schedule individual meetings with multiple employees. As another example, a salesperson may wish to schedule meetings with multiple potential clients. While these examples are one-to-many scheduling examples, other situations (e.g., one-to-one) can also benefit from the techniques described herein.

Figure 1:
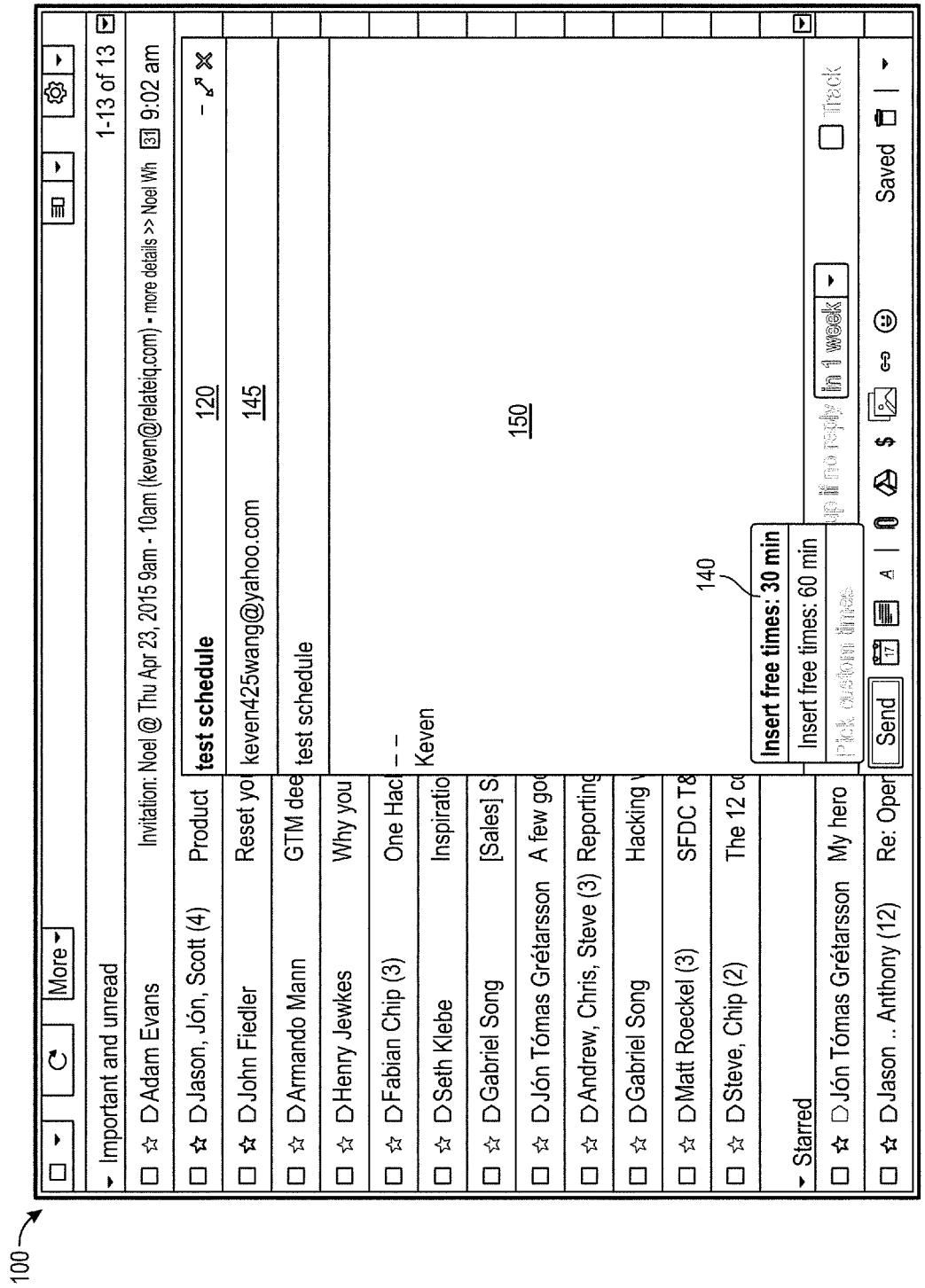
FIG. 1 is an example electronic mail interface that can be used for dynamic calendaring as described herein.

FIG. 1 is an example electronic mail interface that can be used for dynamic calendaring as described herein. In one embodiment, electronic mail graphical user interface 100 allows a user to generate an email message having calendaring information as described herein. A user can utilize email GUI 100 to generate message 120 that can be used to schedule one or more meetings with the techniques described herein.

In one embodiment, message window 120 includes a calendar icon (or some other indicator) that is used to schedule calendar items as described herein. In one embodiment, the calendar icon provides pop-up box 140 that allows the user to select time durations for calendar items to be scheduled. Other features can also be included in pop-up box 140, for example, reminder settings, priorities. The user can also provide a message in area 150 to be provided to the recipient indicated in address field 145. Additional and/or different email functions can also be provided.

Figure 2:
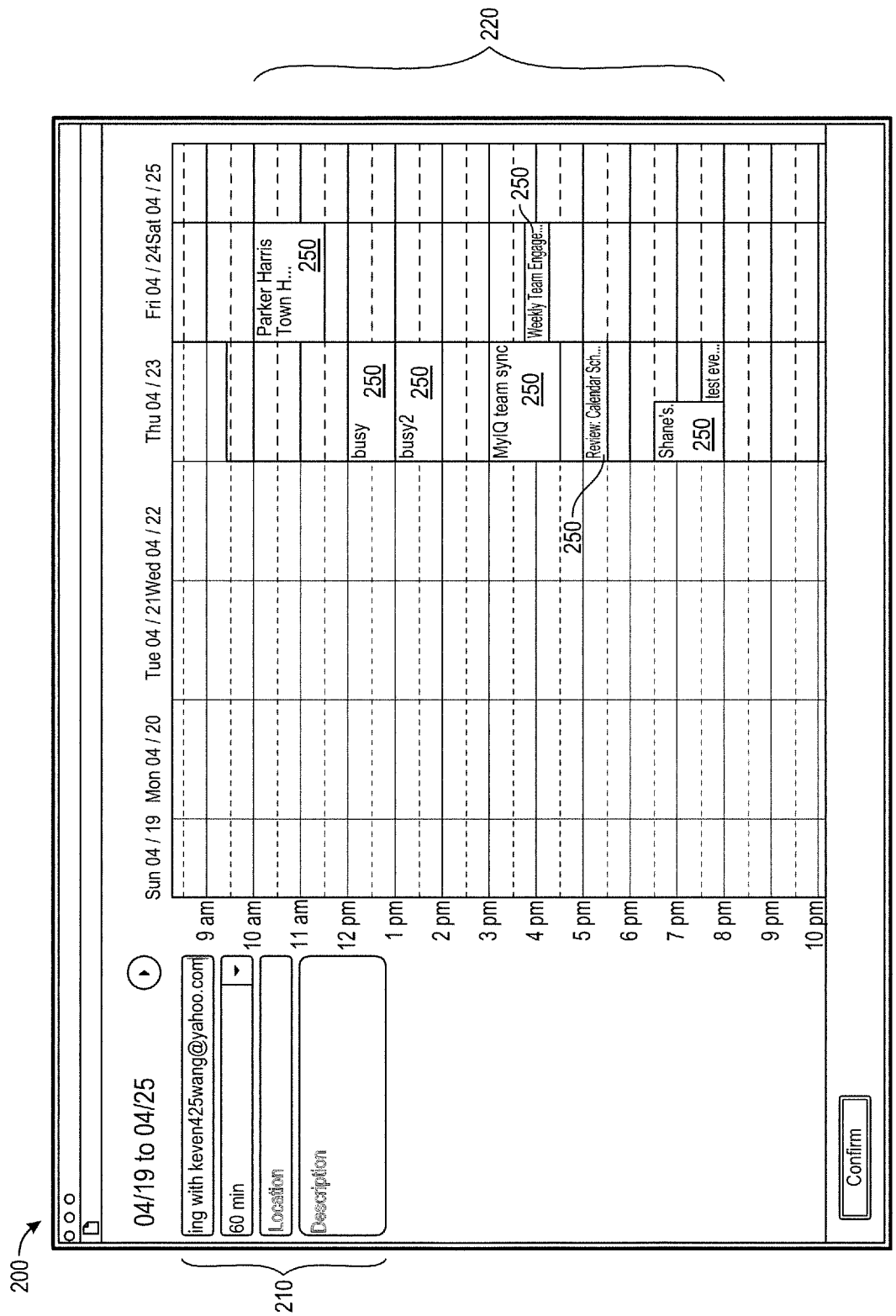
FIG. 2 is an example electronic calendar interface that can be used for dynamic calendaring as described herein.

FIG. 2 is an example electronic calendar interface that can be used for dynamic calendaring as described herein. In the example of FIG. 2, window 200 provides an overview of the calendar corresponding to the user generating the email message of FIG. 1. Fields 210 allow the user to label the calendar event, select the time, designate a location, provide a description and/or other operations. Calendar 220 provides the calendar information including previously scheduled events 250 as well as available time.

Figure 3:
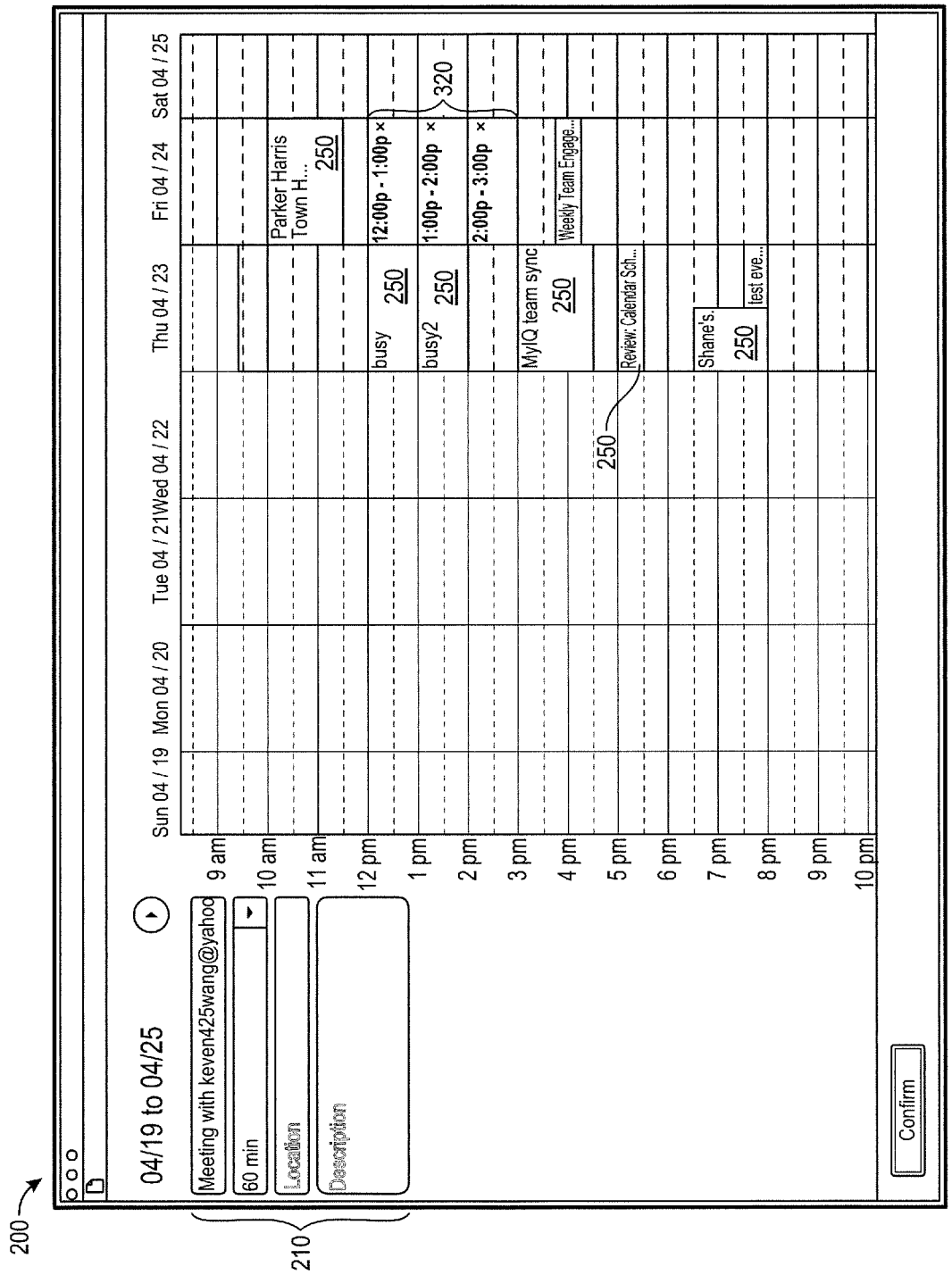
FIG. 3 is an example electronic calendar interface that can be used for dynamic calendaring as described herein.

FIG. 3 is an example electronic calendar interface that can be used for dynamic calendaring as described herein. In the example of FIG. 3, potential calendar entries 320 matching the parameters provided by fields 210 and/or information from email message 120 of FIG. 1 (e.g., pop-up box 140) are selected. Potential calendar entries 320 can be automatically selected based on provided parameters and/or can be manually selected by the user. Potential calendar entries 320 are the entries that will be provided to the email recipient (e.g., the recipient designated in address field 145 of FIG. 1). In the example of FIG. 3, potential calendar entries 320 are all adjacent on a single day; however, selected potential calendar entries are not required to be adjacent or on the same day.

Figure 4:
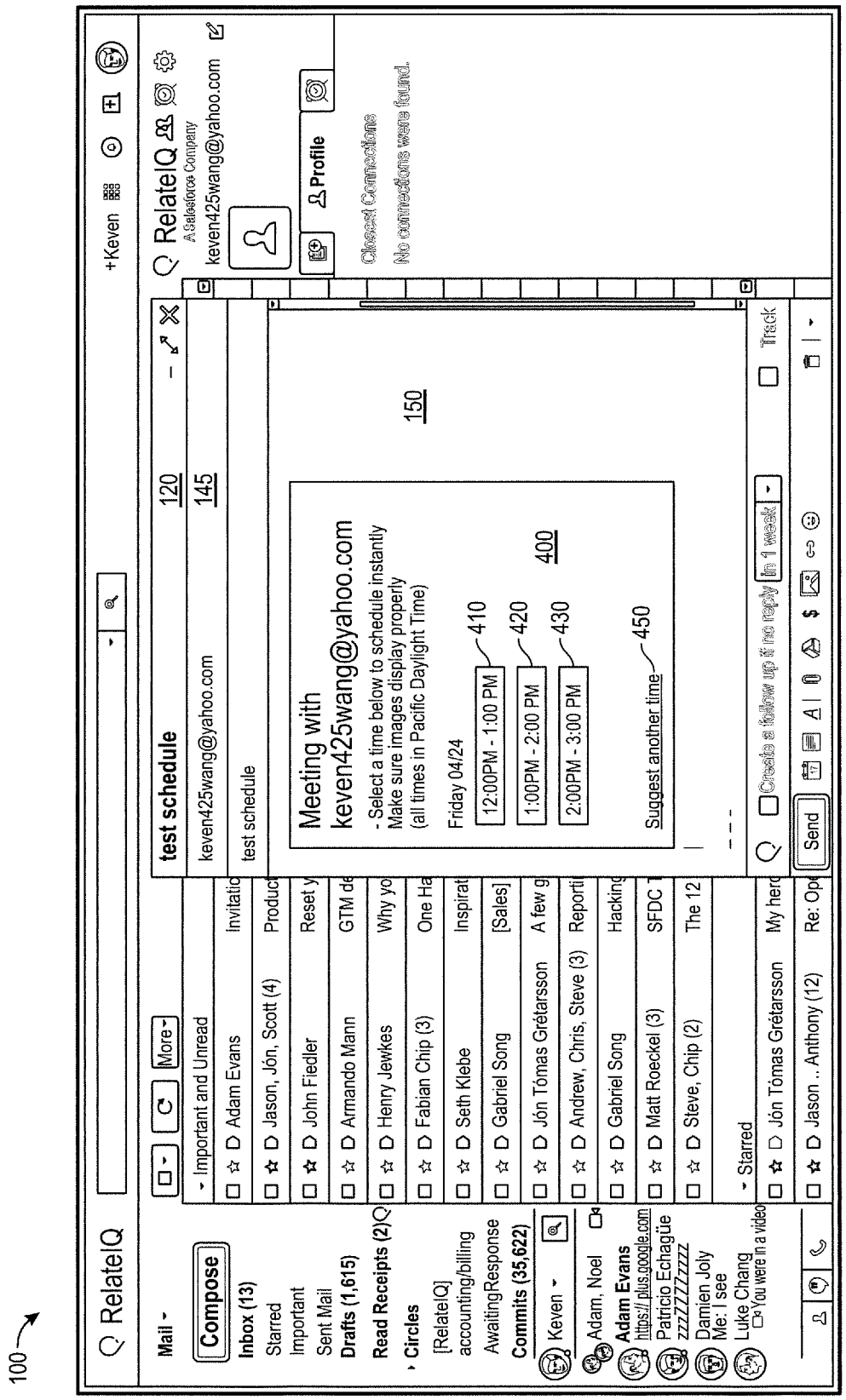
FIG. 4 is an example electronic mail interface that can utilize the selected potential calendar entries as described herein.

FIG. 4 is an example electronic mail interface that can utilize the selected potential calendar entries as described herein. In the example of FIG. 4, information (e.g., date, time, requestor) 400 can be provided in message field 150 of email message 120. The user can provide additional message information, if desired. In one embodiment, each potential calendar entry is included in information 400 as an image. In one embodiment, the images do not have borders so as to not appear as images in the message. In one embodiment, information 400 can include additional information and/or functionality, for example, link 450 can allow the recipient to propose different times if the selected potential calendar entries do not work for them.

Figure 5:
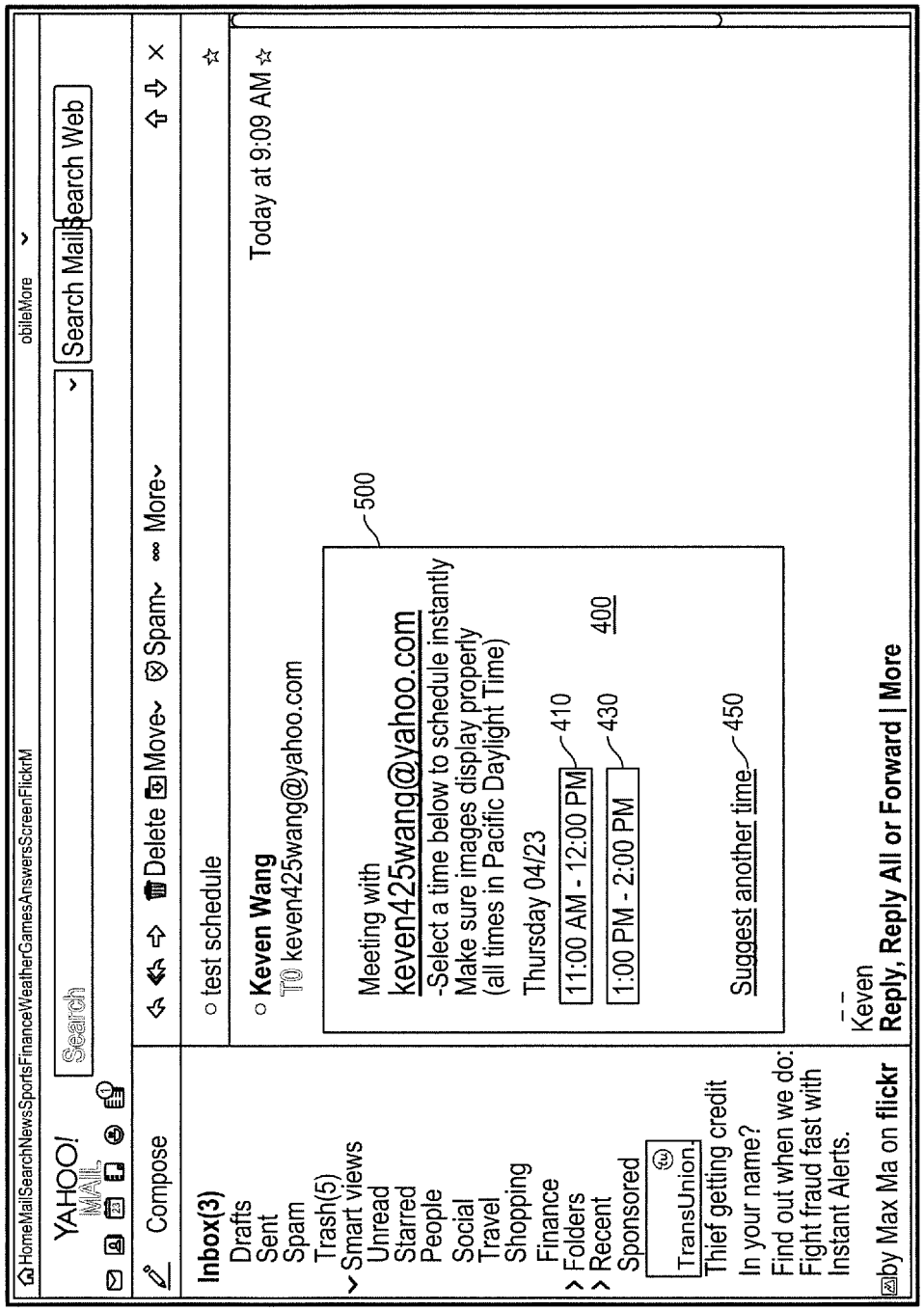
FIG. 5 is an example electronic mail message received by a recipient having one or more selected potential calendar entries as provided using the techniques described herein.

FIG. 5 is an example electronic mail message received by a recipient having one or more selected potential calendar entries as provided using the techniques described herein. In one embodiment, when the recipient opens an email message as generated as described above. In one embodiment, when the recipient opens message 500, the recipient's email application is caused to retrieve images 410, 420 and 430 (as illustrated in FIG. 4). Images 410, 420 and 430 can be retrieved from, for example, an email server/program (or other system entity) that has access to the calendar corresponding to the user (e.g., calendar 200 in FIGS. 2 and 3).

In one embodiment, in response to the request for the images, the email server/program (or other system entity) can check the user's calendar (200 in FIGS. 2 and 3) and determine if any of the selected potential calendar entries have been taken. If any of the selected potential calendar entries have been taken (420 in the current example), the image for that potential calendar entry would not be provided (or a blank image could be provided) for use in displaying email message 500. For example, if three recipients received email message 500, the first to select a calendar entry would be given that entry and the other recipients would not be able to select that time. Thus, the recipient would only see images corresponding to the selected potential calendar entries that are available at the time message 500 is opened. As another example, if three recipients receive email messages containing the same time slot, the first recipient to select a calendar entry would be given that entry and the other recipients would not be able to select that time. In one embodiment, this information can be updated.

In one embodiment, displayed potential calendar entries 410 and 430 within email message 500 have an associated link. When the recipient selects one of the potential calendar entries, the link causes the email server/program (or other system entity) to generate a corresponding calendar entry in the user's calendar (calendar 200 in FIGS. 2 and 3). The generated calendar entry can include, for example, information (e.g., name, contact information, location) for the recipient that accepted the corresponding calendar entry.

Figure 6:
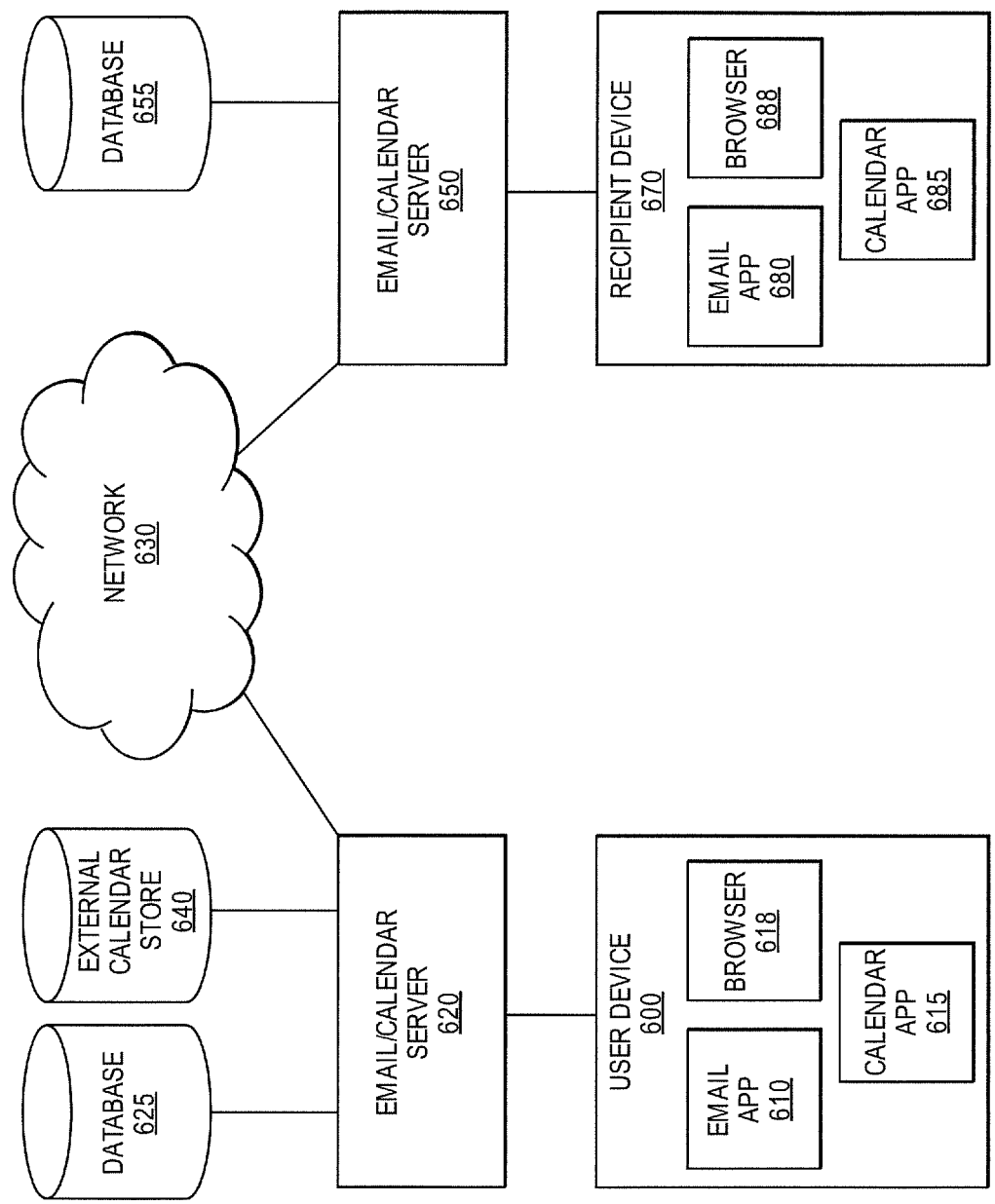
FIG. 6 is a block diagram of one embodiment of a system to provide dynamic calendaring as described herein.

FIG. 6 is a block diagram of one embodiment of a system to provide dynamic calendaring as described herein. One or more of the elements of FIG. 6 (e.g., user device 600, recipient device 670) can be electronic systems such as the one described with respect to FIG. 7.

In one embodiment, user device 600 can be any type of user electronic device that allows a user to generate an email message using, for example, email app 610. In another embodiment, the user can utilize browser 618 on user device 600 to generate the email message. Similarly, the user can utilize user device 600 to mange his/her calendar using calendar app 615 and/or browser 618.

In one embodiment, user device 600 interacts with email/calendar server 620 to provide the email and calendar functionality described herein. For example, email/calendar server 620 can host email and/or calendar information and provide information as requested by user device 600. In some embodiments, some or all of the email and calendar information may be stored on user device 600. In one embodiment, email/calendar server 620 utilizes database 625 for storage of data related to providing email and/or calendar functionality as described herein.

In one embodiment, email/calendar server 620 can access external calendar store 640 to retrieve electronic calendar data. In one embodiment, external calendar store 640 belongs to an electronic calendar provider (e.g., Google®, Outlook®, Cozi®, Keep and Share, CaldendarWiz) that can be accessed by email/calendar server 620. Some electronic calendar providers may have quotas, or limits, on the number/frequency of accesses are allowed, for example, via an API or other interface.

Email/calendar server 620 may communicate with email/calendar server 650 via network 630. Network 630 can be any type of networking architecture that allows electronic devices to communicate with each other. Network 630 can be, for example, the Internet, a local area network, a virtual private network, etc. Email/calendar server 650 provides email and/or calendar functionality for recipient device 670 to allow recipient device 670 to receive calendar/scheduling requests as described herein. In one embodiment, email/calendar server 650 utilizes database 655 for storage of data related to providing email and/or calendar functionality as described herein.

In one embodiment, recipient device 670 can be any type of user electronic device that allows a user thereof to receive an email message using, for example, email app 680. In another embodiment, the user of recipient device 670 can utilize browser 688 on recipient device 670 to generate the email message. Similarly, recipient device 670 can be used to mange a calendar using calendar app 685 and/or browser 688.

In one embodiment, a user utilizes user device 600 and/or email/calendar server 620 to generate an email message having proposed calendar entries, for example, as described with respect to FIGS. 1-4. The email message is transmitted using any technique known in the art to allow a user of recipient device 670 to receive the email message having the proposed calendar entries, for example, as described with respect to FIG. 5.

The user of recipient device 670 can utilize recipient device 670 to select one of the proposed calendar entries. In one embodiment, as discussed above, one or more of the proposed calendar entries is displayed as an image within the email message on recipient device 670. One or more links may be associated with the image(s) to allow selection of one of the proposed calendar entries. Recipient device 670 and/or email/calendar server 650 can interact with email/calendar server 620 and/or user device 600 to select one of the proposed calendar entries.

Figure 7:
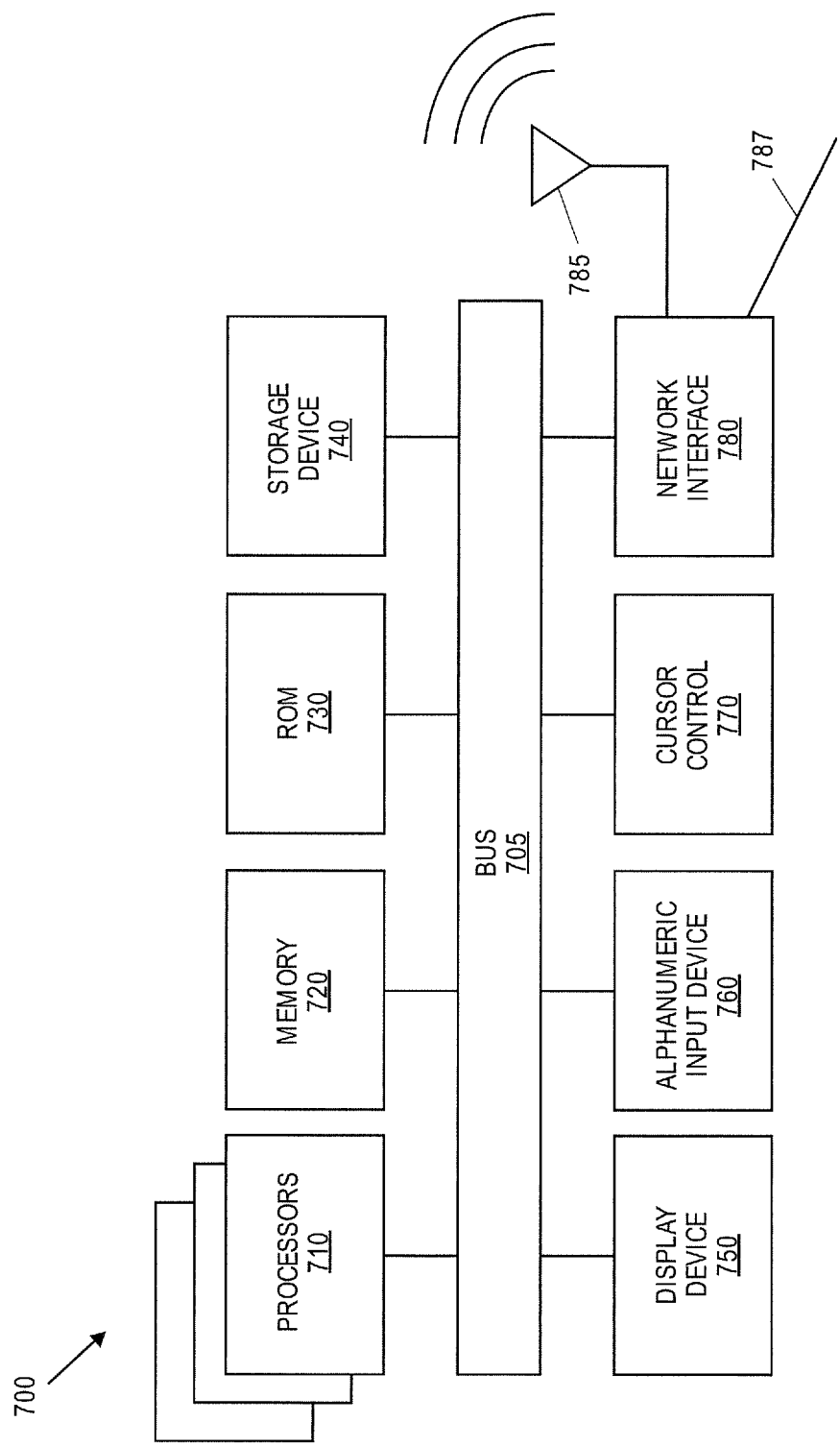
FIG. 7 is a block diagram of one embodiment of an electronic system.

FIG. 7 is a block diagram of one embodiment of an electronic system. The electronic system illustrated in FIG. 7 is intended to represent a range of electronic systems (either wired or wireless) including, for example, desktop computer systems, laptop computer systems, cellular telephones, smartphones, tablets, wearable computing devices, etc. Alternative electronic systems may include more, fewer and/or different components.

Electronic system 700 includes bus 705 or other communication device to communicate information, and processor 710 coupled to bus 705 that may process information. While electronic system 700 is illustrated with a single processor, electronic system 700 may include multiple processors and/or co-processors. Electronic system 700 further may include random access memory (RAM) or other dynamic storage device 720 (referred to as main memory), coupled to bus 705 and may store information and instructions that may be executed by processor 710. Main memory 720 may also be used to store temporary variables or other intermediate information during execution of instructions by processor 710.

Electronic system 700 may also include read only memory (ROM) and/or other static storage device 730 coupled to bus 705 that may store static information and instructions for processor 710. Data storage device 740 may be coupled to bus 705 to store information and instructions. Data storage device 740 such as a magnetic disk or optical disc and corresponding drive may be coupled to electronic system 700.

Electronic system 700 may also be coupled via bus 705 to display device 750, such as a cathode ray tube (CRT) or liquid crystal display (LCD), to display information to a user. Alphanumeric input device 760, including alphanumeric and other keys, may be coupled to bus 705 to communicate information and command selections to processor 710. Another type of user input device is cursor control 770, such as a mouse, a trackball, or cursor direction keys to communicate direction information and command selections to processor 710 and to control cursor movement on display 750.

Electronic system 700 further may include network interface(s) 780 to provide access to a network, such as a local area network. Network interface(s) 780 may include, for example, a wireless network interface having antenna 785, which may represent one or more antenna(e). Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 8:
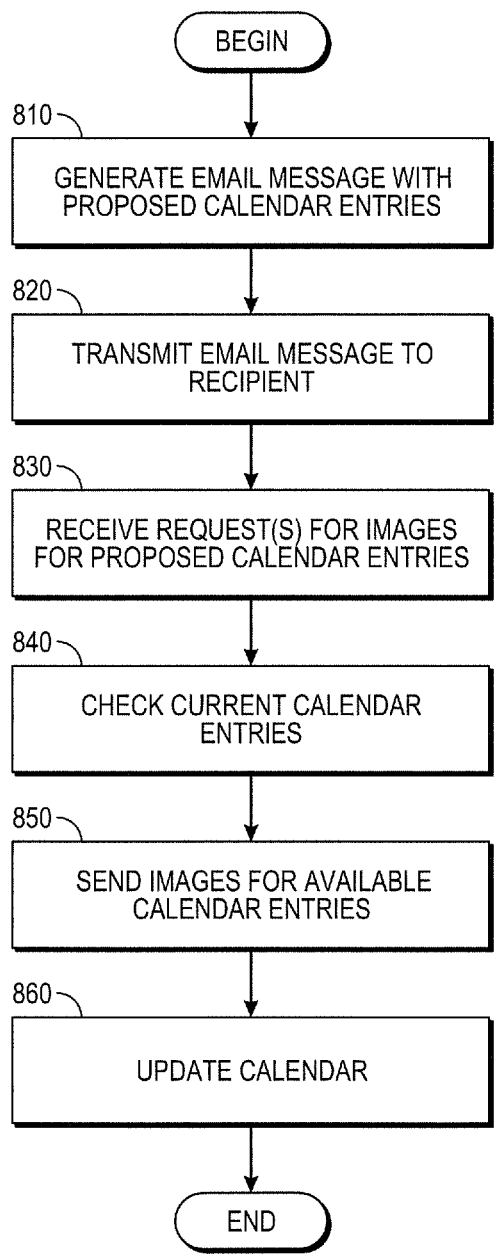
FIG. 8 is a flow diagram of one embodiment of a technique for providing dynamic calendaring as described herein.

FIG. 8 is a flow diagram of one embodiment of a technique for providing dynamic calendaring as described herein. In one embodiment, the operations described with respect to FIG. 8 are performed primarily by components on the sender side of the transaction (e.g., user device 600, email/calendar server 620); however, other configurations can also be supported.

An email message is generated with proposed calendar entries, 810. FIGS. 1 and 4 provide graphical examples of the type of email message that may be generated. In one embodiment, calendaring information is accessed (or generated) through the email interface. For example, email message 120 in FIG. 1 includes pop-up box that can be part of the dynamic calendaring process. In one embodiment, the email application and/or the calendar application (on a server or on the user's device) can automatically generate a set of proposed calendar entries based on parameters provided (e.g., meeting length, location, meeting duration, travel times). In another embodiment, the user can designate proposed calendar entries via the calendar application.

As discussed above, the proposed calendar entries are represented by images in the email message that the recipient opens. In one embodiment, images are embedded in the in the original message. In another embodiment, links (or calls) are embedded in the original message to request the images corresponding to the proposed calendar entries. In one embodiment, HyperText Markup Language (HTML) can be used to include remote images in the email message.

Once the email message has been generated, the email message is transmitted to the recipient, 820. The email message can be transmitted in any manner known in the art. In one embodiment, the email message is stored on a server (e.g., email/calendar server 650) until accessed by the recipient electronic device (e.g., recipient device 670). When the email message is opened by the recipient device, a request may be received for one or more images corresponding to the proposed calendar entries, 830. In one embodiment, the requests are received by email/calendar server 620; however, in other embodiments, other components can access email/calendar server 620.

The current calendar entries are checked, 840, to determine if one or more of the original proposed calendar entries has become unavailable. Images corresponding to the available proposed calendar entries are sent to the recipient device, 850. Thus, the recipient only sees the available proposed calendar entries. In one embodiment, a blank image (e.g., all white) is returned for unavailable proposed calendar entries. In another embodiment, some other image other than the time of the unavailable proposed calendar entry is provided.

In response to the recipient selecting one of the images in the email message, the calendar is updated, 860, to indicate that the proposed calendar entry has been taken by the recipient. The calendar may be updated to reflect, for example, the name of the person accepting the proposed calendar entry. Additional information may also be provided, for example, comments from the recipient, the time that the recipient accepted, etc.

Figure 9:
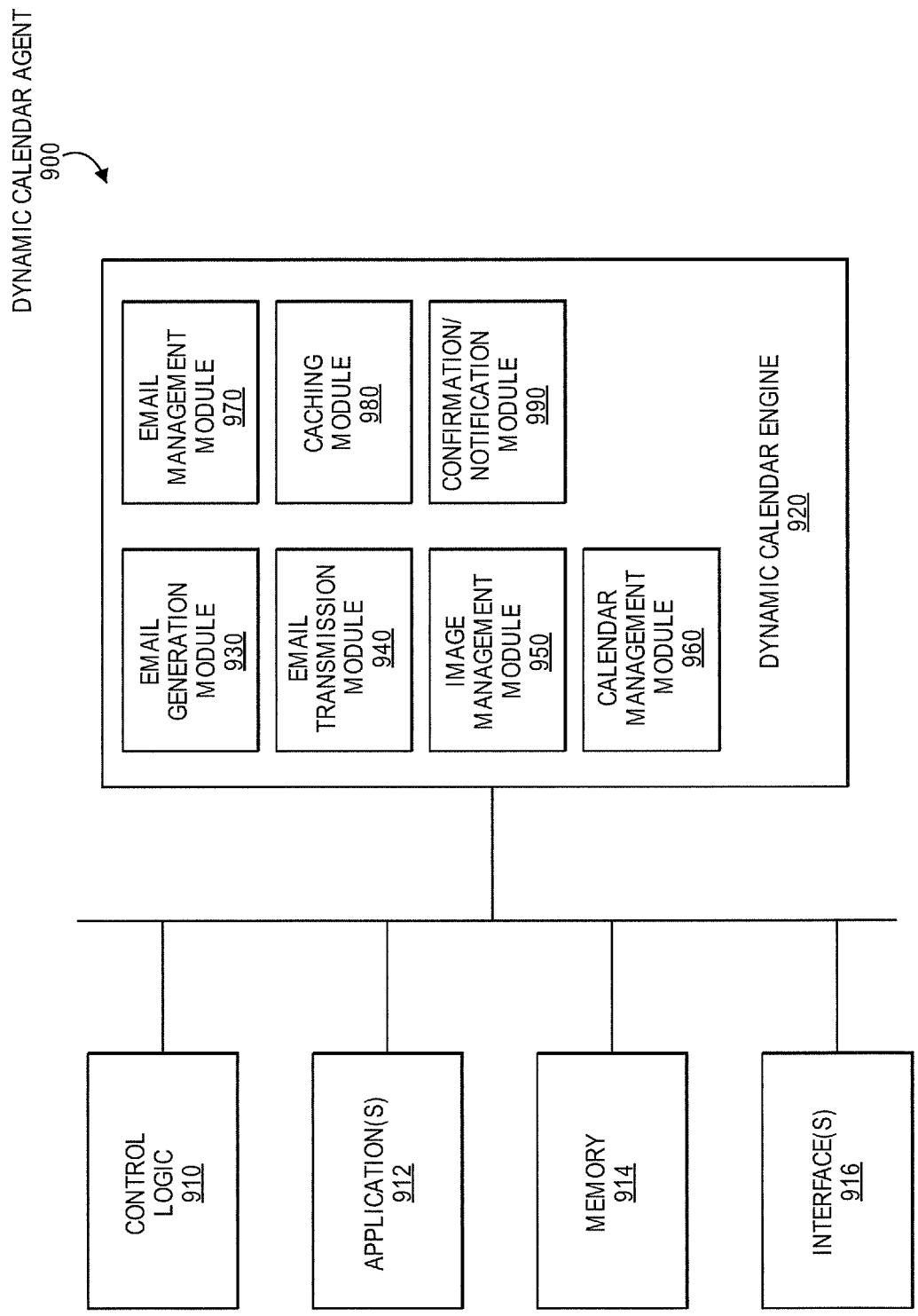
FIG. 9 is a block diagram of one embodiment of a dynamic calendar agent.

FIG. 9 is a block diagram of one embodiment of a dynamic calendar agent. In one embodiment, dynamic calendar agent 900 includes control logic 910, which implements logical functional control to direct operation of dynamic calendar agent 900, and/or hardware associated with directing operation of dynamic calendar agent 900. Logic may be hardware logic circuits and/or software routines. In one embodiment, dynamic calendar agent 900 includes one or more applications 912, which represent code sequence and/or programs that provide instructions to control logic 910.

In one embodiment, dynamic calendar agent 900 includes memory 914, which represents a memory device and/or access to a memory resource for storing data and/or instructions. Memory 914 may include memory local to dynamic calendar agent 900, as well as, or alternatively, including memory of the host system on which dynamic calendar agent 900 resides. Dynamic calendar agent 900 also includes one or more interfaces 916, which represent access interfaces to/from (an input/output interface) dynamic calendar agent 900 with regard to entities (electronic or human) external to dynamic calendar agent 900.

Dynamic calendar agent 900 also includes dynamic calendar engine 920, which represents one or more functions or module that enable dynamic calendar agent 900 to provide the dynamic calendar functionality as described above. The example of FIG. 9 provides several modules that may be included in dynamic calendar engine 920; however, different and/or additional modules may also be included. Example modules that may be involved in providing the dynamic calendar functionality include email generation module(s) 930, email transmission module 940, image management module 950, calendar management module 960 and email management module 970. Each of these modules may further include other sub-modules to provide other functions. As used herein, a module refers to routine, a subsystem, logic circuit, microcode, etc., whether implemented in hardware, software, firmware or some combination thereof.

In one embodiment, email generation module 930 operates to provide email functionality including the functionality to include proposed calendar entries as described above with respect to FIGS. 1, 4 and 6. Email generation module 930 can provide all or part of a graphical user interface that allows the user to utilize the dynamic calendar functionality described herein. Email generation module 930 may interact with other components (e.g., a contacts database/app, an electronic calendar, social media) to allow the user to generate email messages.

In one embodiment, email transmission module 940 operates to provide the functionality to cause the email message to be transmitted to the correct recipient. Email transmission module 940 operates to provide addressing information, communication protocol information, etc.

In one embodiment, image management module 950 operates to provide images corresponding to available proposed calendar entries, for example, as described above with respect to FIG. 9. In one embodiment, image management module 950 responds to HTML requests for inclusion of remote images in the email message presented to the recipient. In alternate embodiments, other languages/protocols can be supported.

In one embodiment, calendar management module 960 operates to read and update the electronic calendar. For example, calendar management module can operate with image management module 950 and/or other modules to determine which times correspond to proposed calendar entries and to determine whether those times are available. In one embodiment, calendar management module 960 can communicate with one or more servers and/or databases to acquire the desired calendar information. Calendar management module 960 can also function to update the calendar in response to the recipient selecting a proposed calendar entry.

In one embodiment, in order to reduce the number of calendar API requests, the electronic calendar information can be cached on a server without API quotas (e.g., the host electronic calendar). In one embodiment, caching module 980 cause calendar data to be cached in a backend of a server providing the dynamic calendaring functionality and/or image as described herein. In one embodiment, for serving time selection (e.g., FIG. 2) and rendering time slot images (e.g., FIG. 5) cached user calendar data is utilized. In one embodiment, the host calendar server (e.g., Google®, Outlook®) is only queried when a recipient clicks on a proposed calendar entry image. In one embodiment, the cached calendar information is updated each time there is a query to the host electronic calendar.

In one embodiment, email management module 970 operates to provide general email functionality. In one embodiment, email management module 970 provides an interface between the email application and the calendar application to support dynamic calendar functionality as described herein. In one embodiment, confirmation/notification module 990 manages confirmation and notifications/interfaces (e.g., FIGS. 12 and 13) with respect to calendaring functionality as described herein.

The following examples provide functionality that can be added to, or intermixed with, the functionality described above.

Figures 10, 11:
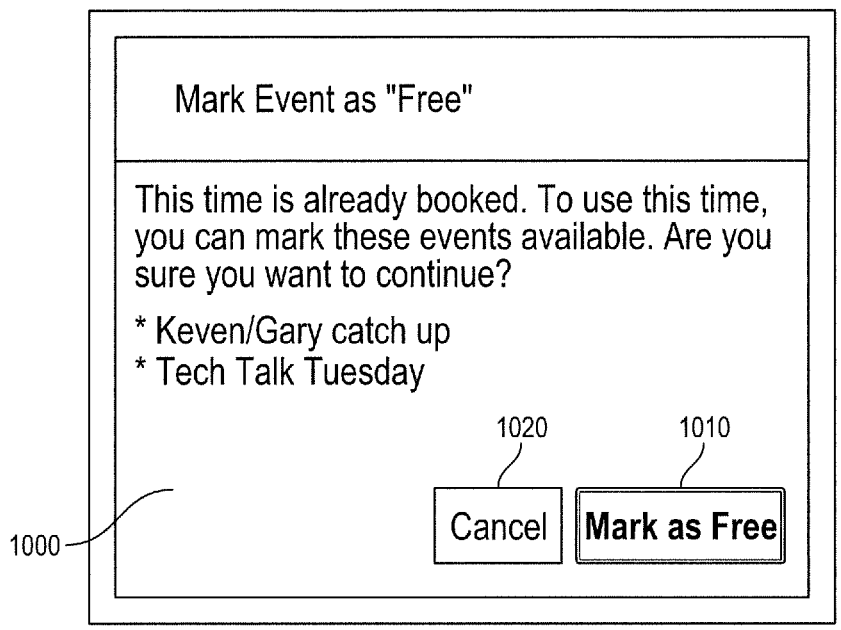
FIG. 10 is an example embodiment utilizing free events.
FIG. 11 is an example embodiment of a time picker supporting utilization of free events.

FIG. 10 is an example embodiment utilizing free events. Many electronic calendars have a free/busy concept for each event. It is possible for a calendar user to have a reminder and/or an all-day event on the electronic calendar, but would be willing to schedule events over these reminders and/or all-day events. In one embodiment, the calendaring concepts described herein can function to respect the free/busy status and allow a user to update a free/busy status associated with an event from the dynamic calendar application/interface.

For example, when a sender is utilizing the time picker (e.g., FIG. 2), they can select time over an existing event and mark the event as free. In one embodiment, the user can be provided with dialog 1000 that informs the user that the selected time is already booked, but can be designated as free for dynamic scheduling purposes. The user can mark the time as free, 1010, or can leave the time as busy, 1020.

FIG. 11 is an example embodiment of a time picker supporting utilization of free events. In one embodiment, when an event is marked as free (e.g., FIG. 10), that event can be visually indicated as free in the time picker, for example, by being displayed as transparent, a different color, in italics and/or a different font. Other free time indicators can also be used. This provides a visual indication that the free event can be scheduled over by another event that will not cause a conflict. In the example of FIG. 11, event 1110 (Project . . . ) is free, but event 1120 (Code-uc . . . ) is not.

FIG. 12 is an example of a confirmation interface. In one embodiment, the confirmation interface is managed by a confirmation module (e.g., confirmation/notification module 990). In one embodiment, confirmation 1200 is provided via a popup window when a user selects a time slot in an email. In one embodiment, the popup window is optimized to render in browser and mobile clients.

FIG. 13 is an example notification interface. Under some conditions, images may not render properly to represent updated availability. For example, when a time slot image is rendered, but the underlying time is unavailable or already booked. This can happen, for example, when a recipient had the email message open for a long time during which the sender's calendar has changed, or when the calendar data cache is out of date. In one embodiment, to resolve this, when a recipient selects an outdated time slot, a live query can be performed to the host calendar API to determine if the underlying time is still available. If the time is not available, message 1300 (or a similar message) can be provided via, for example, confirmation/notification module 990).

Figure 14:
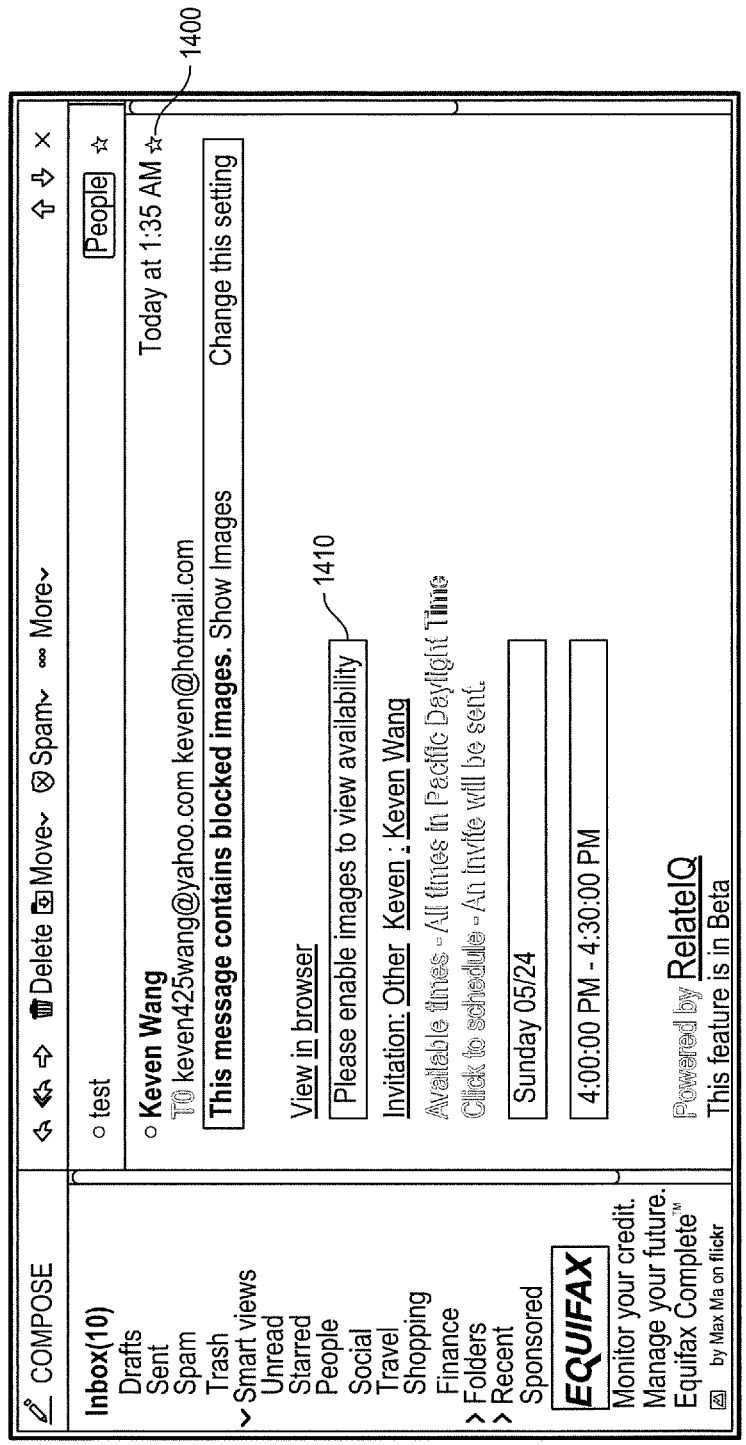
FIG. 14 is an email interface where images may be blocked.

FIG. 14 is an email interface where images may be blocked. In some situations, an email user may have images blocked, for example, for security or privacy purposes. In one embodiment, the HTML "alt" attribute (or similar functionality in other languages) can be utilized to display alert text 1410 in email message 1400. The alert text may say, for example, "Please enable images to view availability." In one embodiment, this would renders as an empty image if images are enabled for email 1400. The "alt" attributed is an accessibility feature of HTML.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed, cause one or more hardware processors to:
    generate, with the one or more hardware processors, an electronic mail message to have at least two embedded images that correspond to at least two availability time slots indicating available calendar times;
    transmit to a receiving electronic device via a network connection, with the one or more hardware processors, the electronic mail message having the at least two embedded images;
    receive, with the one or more hardware processors after the electronic mail message has been accessed by the receiving electronic device, a request for the at least two embedded images;
    check schedule data, with the one or more hardware processors, for at least one electronic calendar stored in at least one memory device to determine a status of the at least one electronic calendar at a time corresponding to each of the at least two availability time slots in response to receiving the request for the at least two embedded images;
    provide, for each availability time slot for which corresponding time is available, the corresponding embedded image indicating available calendar times at a second time and a blank image or no image for each availability time slot for which the corresponding time is not available; and
    cause the receiving electronic device to display the electronic mail message including the corresponding embedded images indicating available calendar times, if any, and the blank images, if any to graphically represent the available calendar times at the second time.

2. The non-transitory computer-readable medium of claim 1 wherein an indication comprises at least markup language code indicating a remote image to be loaded in the electronic mail message.

3. The non-transitory computer-readable medium of claim 1 wherein an indication comprises at least a link to a remote image.

4. The non-transitory computer-readable medium of claim 1 further comprising:
    receiving an indication of selection of one of the available calendar times; and
    updating the at least one electronic calendar to indicate selection of one of the available calendar times.

5. The non-transitory computer-readable medium of claim 1 wherein generating the electronic mail message further comprises:
    determining, automatically and in response to one or more time parameters, one or more proposed electronic calendar entries corresponding to times that the electronic calendar indicates availability; and
    generating an indication of a proposed electronic calendar entry for at least one of the corresponding times indicated as available by the electronic calendar.

6. The non-transitory computer-readable medium of claim 1 further comprising:
    caching calendar data corresponding to entries of the electronic calendar on a server without application program interface (API) quotas in response to API quotas on a server hosting the electronic calendar; and
    accessing the cached calendar data to check, in response to receiving the request, at least one electronic calendar to determine the status of the electronic calendar at times the time corresponding to each of the at least one proposed electronic calendar entry.

7. A method comprising:
    generating, with the one or more hardware processors, an electronic mail message to have at least two embedded images that correspond to at least two availability time slots indicating available calendar times;
    transmitting to a receiving electronic device via a network connection, with the one or more hardware processors, the electronic mail message having the at least two embedded images;
    receiving, with the one or more hardware processors after the electronic mail message has been accessed by the receiving electronic device, a request for the at least two embedded images;
    checking schedule data, with the one or more hardware processors, for at least one electronic calendar stored in at least one memory device to determine a status of the at least one electronic calendar at a time corresponding to each of the at least two availability time slots in response to receiving the request for the at least two embedded images;
    providing, for each availability time slot for which corresponding time is available, the corresponding embedded image indicating available calendar times at a second time and a blank image or no image for each availability time slot for which the corresponding time is not available; and
    causing the receiving electronic device to display the electronic mail message including the corresponding embedded images indicating available calendar times, if any, and the blank images, if any to graphically represent the available calendar times at the second time.

8. The method of claim 7 wherein an indication comprises at least markup language code indicating a remote image to be loaded in the electronic mail message.

9. The method of claim 7 wherein an indication comprises at least a link to a remote image.

10. The method of claim 7 further comprising:
    receiving an indication of selection of one of the available calendar times; and
    updating the at least one electronic calendar to indicate selection of one of the available calendar times.

11. The method of claim 7 wherein generating the electronic mail message further comprises:
    determining, with the electronic computing device, automatically and in response to one or more time parameters, one or more proposed electronic calendar entries corresponding to times that the electronic calendar indicates availability; and generating, with the electronic computing device, an indication of a proposed electronic calendar entry for at least one of the corresponding times indicated as available by the electronic calendar.

12. The method of claim 7 further comprising:

caching calendar data corresponding to entries of the electronic calendar on a server without application program interface (API) quotas in response to API quotas on a server hosting the electronic calendar; and accessing the cached calendar data to check, in response to receiving the request, at least one electronic calendar to determine the status of the electronic calendar at times the time corresponding to each of the at least one proposed electronic calendar entry.

13. A system comprising at least a client device and at least a server device communicatively coupled together to generate, with the one or more hardware processors, an electronic mail message to have at least two embedded images that correspond to at least two availability time slots indicating available calendar times, to transmit to a receiving electronic device via a network connection, with the one or more hardware processors, the electronic mail message having the at least two embedded images, to receive, with the one or more hardware processors after the electronic mail message has been accessed by the receiving electronic device, a request for the at least two embedded images, to check schedule data, with the one or more hardware processors, for at least one electronic calendar stored in at least one memory device to determine a status of the at least one electronic calendar at a time corresponding to each of the at least two availability time slots in response to receiving the request for the at least two embedded images, to provide, for each availability time slot for which corresponding time is available, the corresponding embedded image indicating available calendar times at a second time and a blank image or no image for each availability time slot for which the corresponding time is not available, and to cause the receiving electronic device to display the electronic mail message including the corresponding embedded images indicating available calendar times, if any, and the blank images, if any to graphically represent the available calendar times at the second time.

14. The system of claim 13 wherein an indication comprises at least markup language code indicating a remote image to be loaded in the electronic mail message.

15. The system of claim 13 wherein an indication comprises at least a link to a remote image.

16. The system of claim 13 further to receive an indication of selection of one of the available calendar times, and to update the at least one electronic calendar to indicate selection of one of the available calendar times.

17. The system of claim 13 wherein generating the electronic mail message further comprises:

determining, automatically and in response to one or more time parameters, one or more proposed electronic calendar entries corresponding to times that the electronic calendar indicates availability; and generating an indication of a proposed electronic calendar entry for at least one of the corresponding times indicated as available by the electronic calendar.

18. The system of claim 13 further configured to cache calendar data corresponding to entries of the electronic calendar on a server without application program interface (API) quotas in response to API quotas on a server hosting the electronic calendar, and to access the cached calendar data to check, in response to receiving the request, at least one electronic calendar to determine the status of the electronic calendar at times corresponding to each of the proposed electronic calendar entry.

* * * * *